(12) United States Patent
Hart et al.

(10) Patent No.: US 11,876,797 B2
(45) Date of Patent: Jan. 16, 2024

(54) MULTI-FACTOR GEOFENCING SYSTEM FOR SECURE ENCRYPTION AND DECRYPTION SYSTEM

(71) Applicant: Vengar Technologies, LLC, San Antonio, TX (US)

(72) Inventors: Brandon Hart, Irving, TX (US); Courtney Roach, Savannah, TX (US)

(73) Assignee: Everything Blockchain Technology Corp., Jacksonville, FL (US)

( * ) Notice: Subject to any disclaimer, the term of this patent is extended or adjusted under 35 U.S.C. 154(b) by 227 days.

(21) Appl. No.: 17/214,507

(22) Filed: Mar. 26, 2021

(65) Prior Publication Data
US 2021/0306328 A1 Sep. 30, 2021

Related U.S. Application Data

(60) Provisional application No. 63/001,854, filed on Mar. 30, 2020.

(51) Int. Cl.
*H04L 9/40* (2022.01)

(52) U.S. Cl.
CPC ...... *H04L 63/0853* (2013.01); *H04L 63/0435* (2013.01); *H04L 63/107* (2013.01); *H04L 63/20* (2013.01); *H04L 2463/082* (2013.01)

(58) Field of Classification Search
CPC ............. H04L 63/0853; H04L 63/0435; H04L 63/107
USPC ......................................................... 726/26
See application file for complete search history.

(56) References Cited

U.S. PATENT DOCUMENTS

| 6,381,696 | B1 | 4/2002 | Doyle |
| 10,298,554 | B2 | 5/2019 | Pollet et al. |
| 2006/0013402 | A1* | 1/2006 | Sutton ................... H04L 9/0844 380/282 |
| 2010/0150351 | A1 | 6/2010 | Sutton, II et al. |

(Continued)

FOREIGN PATENT DOCUMENTS

WO    2013101358 A1    7/2013

OTHER PUBLICATIONS

"Transient-key cryptography"; white paper; Wikipedia; Oct. 27, 2018; 4 pages.

(Continued)

*Primary Examiner* — Anthony D Brown
(74) *Attorney, Agent, or Firm* — Polansky & Associates, P.L.L.C.; Paul J. Polansky

(57) ABSTRACT

A method includes logging into a server and sending geolocation information to the server by a first device. The first device requests rights to decrypt a secure data file, and in response, the server sends a machine-readable optical label to the first device. The first device displays the machine-readable optical label. A second device logs into the server, and scans the machine-readable optical label displayed by the first device to create a scanned image. The second device decodes data from the scanned image to form decoded data. Geolocation information of the second device and the decoded data are submitted to the server. The decoded data and the geolocation information are validated by the server, and in response to successfully validating the geolocation information, a link completion status indicator is sent to the second device, and information to decrypt the secure data file is sent to the first device.

21 Claims, 12 Drawing Sheets

(56) References Cited

U.S. PATENT DOCUMENTS

| | | |
|---|---|---|
| 2010/0293106 A1* | 11/2010 | Rhoads .............. G06Q 30/02 |
| | | 348/161 |
| 2012/0250863 A1 | 10/2012 | Bukshpun et al. |
| 2013/0013931 A1 | 1/2013 | O'Hare et al. |
| 2013/0124855 A1 | 5/2013 | Varadarajan et al. |
| 2013/0179544 A1 | 7/2013 | Sainnsbury |
| 2013/0219479 A1 | 8/2013 | Desoto et al. |
| 2014/0351586 A1 | 11/2014 | Hook et al. |
| 2016/0373428 A1 | 12/2016 | Shi |
| 2017/0244687 A1 | 8/2017 | Moulds et al. |
| 2017/0323548 A1* | 11/2017 | Glatfelter .............. H04W 4/021 |

OTHER PUBLICATIONS

"ProofMarkTM System Technical Overview"; white paper; Rev. Jul. 2007; Proofspace, 900 Clancy Ave NE, Grand Rapids, MI. 49503; United States; 19 pages.

International Search Report and Written Opinion for International Application No. PCT/US2020/043283, dated Oct. 26, 2020, 7 pages.

International Search Report and Written Opinion for International Application No. PCT/US2021/024598, dated Jul. 6, 2021, 7 pages.

* cited by examiner

MULTI-FACTOR GEOFENCING SYSTEM FOR SECURE ENCRYPTION AND DECRYPTION SYSTEM

FIELD

This disclosure relates generally to data security, and more specifically to methods and systems for exchanging and maintaining data with high levels of security.

BACKGROUND

Recently, reports of data breaches and compromises, thefts, or "hacks" of sensitive user information have become commonplace. Most of the vulnerabilities arise from exchange of user data over public networks, granting remote access to users whose security credentials or passwords can be guessed or automatically emulated, and storage and retrieval of data on systems that can be compromised. The industry has developed methods and algorithms for storing and transmitting data in encrypted format, such as the Advanced Encryption Standard (AES), which defines different block and key sizes and that provide higher levels of complexity for larger block and key sizes. A common AES standard, known as "AES-128", can theoretically be discovered or hacked, although with a great amount of difficulty. While AES standards with higher computational complexity have been developed, many systems use legacy AES-128 encryption or even simpler encryption and are still vulnerable to attack.

A typical system using a public key encryption (PKI) algorithm uses public key/private key encryption, in which the public key is generally available and used to encrypt data, but the private key is kept confidential and can decrypt the data. Because the private key is stored on one or more devices, if the computer itself is breached or hacked and the private key is discovered, the computational complexity of deciphering PKI-encrypted data can be bypassed, and sensitive user data can be exposed.

In the PKI system, an entity known as a certificate authority (CA) has the ability to issue private keys to allow trusted users to gain access to data. However, the CAs themselves have been breached, hacked, or stolen from, leading to counterfeit certificates being issued and user's data being stolen.

Figure 1:
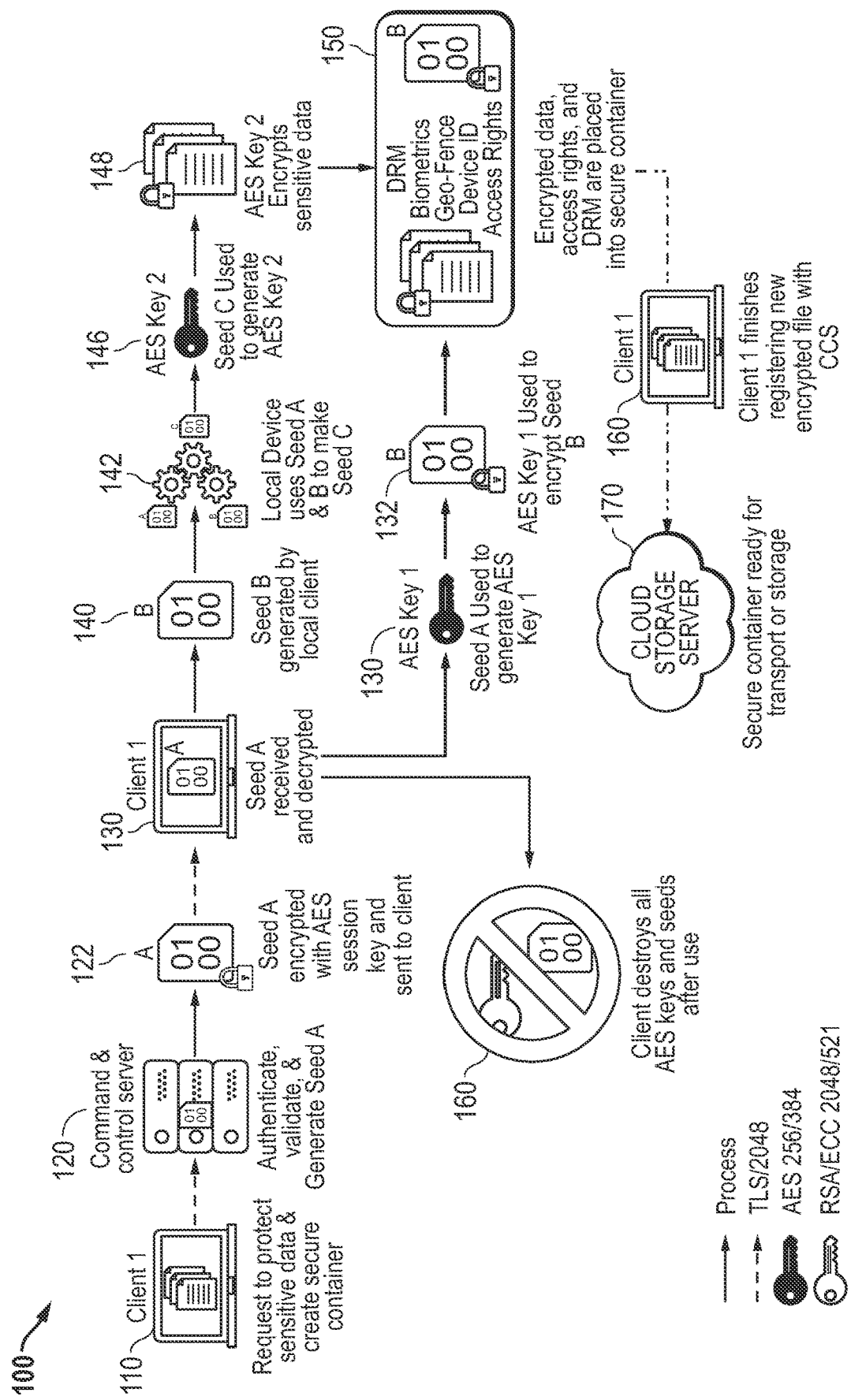
FIG. 1 illustrates a flow diagram that may be used by a data creator according to the embodiments herein.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

Encryption and/or decryption according to the techniques described herein vastly improve known public key/private key systems by making encryption and decryption keys transitory on the user's system, such that they are only in existence for a period of time too short to expose the keys with any significant risk of hacking. The system is symmetric in that the same process is used for both encrypting and decrypting. The system defines a secure "container" for data that practically cannot be hacked.

In general, the inventors have created a transient, symmetric key method that allows for keys to be generated on demand and be present only for short periods of time while needed for encryption and decryption. The approach utilizes a distributed, zero-trust, end-to-end encryption architecture which leverages a new transient symmetric key technology (TSKT). After the keys are no longer needed, they are digitally destroyed by overwriting the values.

There will normally be three unique participants in the enhanced key management process: a data creator, a data accessor, and a command and control server. The data creator creates and encrypts the data. The data accessor has access rights to the encrypted data. The command and control server authenticates, validates and authorizes all creators' and accessors' rights to encrypted data.

Moreover, there are two types of keys that can be used to encrypt data: asymmetric and symmetric. Asymmetric cryptography, also known as Public-Key Infrastructure (PKI), uses a pair of keys (public and private) to encrypt and decrypt data. Traditionally, a network user receives a public and private key pair from a certificate authority. Any other user who wants to send an encrypted message can get the intended recipient's public key directly from the recipient or from a public directory. They use this key to encrypt the data, and they send it to the recipient. When the recipient gets the message, they decrypt it with their private key, which no one else should have access to.

However, this is not the case for the distributed, zero-trust, end-to-end encryption architecture described herein. In the architecture described herein, certificate authorities are unnecessary. Furthermore, the TSKT eliminates the need for a server to use, store, and manage public/private keys for users. The client machines generate their own public/private keys locally as needed. The public key is sent to the server by the local client when making a request to create a secure container or access an existing secure container. That public key is not stored on the server.

Known symmetric cryptography utilizes only one key to encrypt and decrypt data. While symmetric-key systems are generally more simple and faster, their main drawback is that the two parties attempting to communicate must somehow exchange the key in a secure way. This is where the TSKT comes into play, and the TSKT steps are described below. A TKST system according to some embodiments will now be described with a concrete example.

Exemplary TSKT Flows

FIG. 1 shows a flow diagram 100 that may be used by a data creator according to the embodiments herein. In the example shown in FIG. 1, the dashed lines indicate the flow of data over a link using a TLS based protocol. The solid lines represent a processing step that takes place inside a particular node. The black keys are keys encoded using AES. The gray keys are keys encoded using RSA or ECC. In other embodiments, other link protocols and key encryption and decryption standards can be used as well. Using the TKST method, the data creator/protector performs the following steps:

Data Creator/Protector
1. Creator (e.g. Client 1 in FIG. 1) has credentials, and generates public and private keys (RSA or ECC);
2. Creator requests permission from a Command & Control Server (CCS) (hereinafter "Server") to create a secure container;
3. Server authenticates and validates the request;
4. Server generates Seed A via a Pseudo Random Number Generator (PRNG), and Server generates a randomly unique formula;
5. Server encrypts copy of Seed A and the formula with creator's public key, e.g., an ECC 521 public key;
6. Server encrypts and stores Seed A and the formula;
7. Server passes encrypted Seed A and the formula to client via SSL or, as shown in FIG. 1, TLS;
8. Creator decrypts Seed A and the formula using private key;
9. Creator generates Seed B on local device via a PRNG;
10. Creator uses the formula to combine Seed A and B to create Seed C, also known as the Data Seed;
11. Creator generates the payload;
12. Creator uses Seed A to generate AES Key 1;
13. Data Seed (C) is used to generate AES Key 2;
14. Creator uses AES Key 2 to encrypt payload;
15. Creator uses AES Key 1 to encrypt Seed B;
16. AES keys and seeds are destroyed by Creator;
17. Creator combines payload, encrypted Seed B and other data into one container;
18. Creator finishes registering the new secure container with the CCS; and
19. Container is ready for transport or storage, e.g. a cloud storage server.

As shown in FIG. 1, in flow 100 at process node 110 a data creator, also referred to as Client 1, desires to protect sensitive data and to create a secure container for it so it can be accessed by others that Client 1 desires to grant access to. Client 1 has credentials and generates public and private keys using, in the example shown in FIG. 1, ECC/521 cryptography. Alternatively, the public and private keys can be creased using RSA. Client 1 sends its public key to the Command and Control Server (CCS). Subsequently when Client 1 wishes to create a secure container, Client 1 establishes a secure session with the CCS and creates symmetric AES session keys using Client 1's public key before requesting permission to create a secure container. Communication between Client 1 and the CCS uses a secure process such as TLS/2048 over an internet connection to authenticate the user, validate the request, and generate Seed A. At process node 120, the CCS generates an encrypted Seed A that was encrypted with, e.g., the AES session key generated using the data creator's ECC 521 public key, and sends encrypted Seed A to Client 1 as shown at process node 122.

At process node 130, Client 1 receives Seed A and decrypts it using the AES session key. At process node 132, Client 1 uses the AES Key 1 to encrypt Seed B. At process node 140, Client 1 generates Seed B using a PRNG. At process node 142, Client 1 uses Seeds A and B to make Seed C according to the formula. At process node 146, Client 1 uses Seed C to generate a key, namely AES Key 2, and at process node 148, Client 1 uses AES Key 2 to encrypt the data payload, i.e. sensitive data it desires to protect.

At process node 150, Client 1 combines encrypted Seed B and the encrypted data payload, along with various metadata, to create the secure container. At process node 160, Client 1 destroys all AES keys and seeds and the formula after use, including all encrypted forms thereof. At process node 160, Client 1 finishes registering the new secure container with the CCS by sending the metadata to the CCS, encrypted using the AES session key. Finally at process node 170, Client 1 sends the secure container to a storage server, such as a cloud storage server as shown in FIG. 1, securely using TLS/2048.

Figure 2:
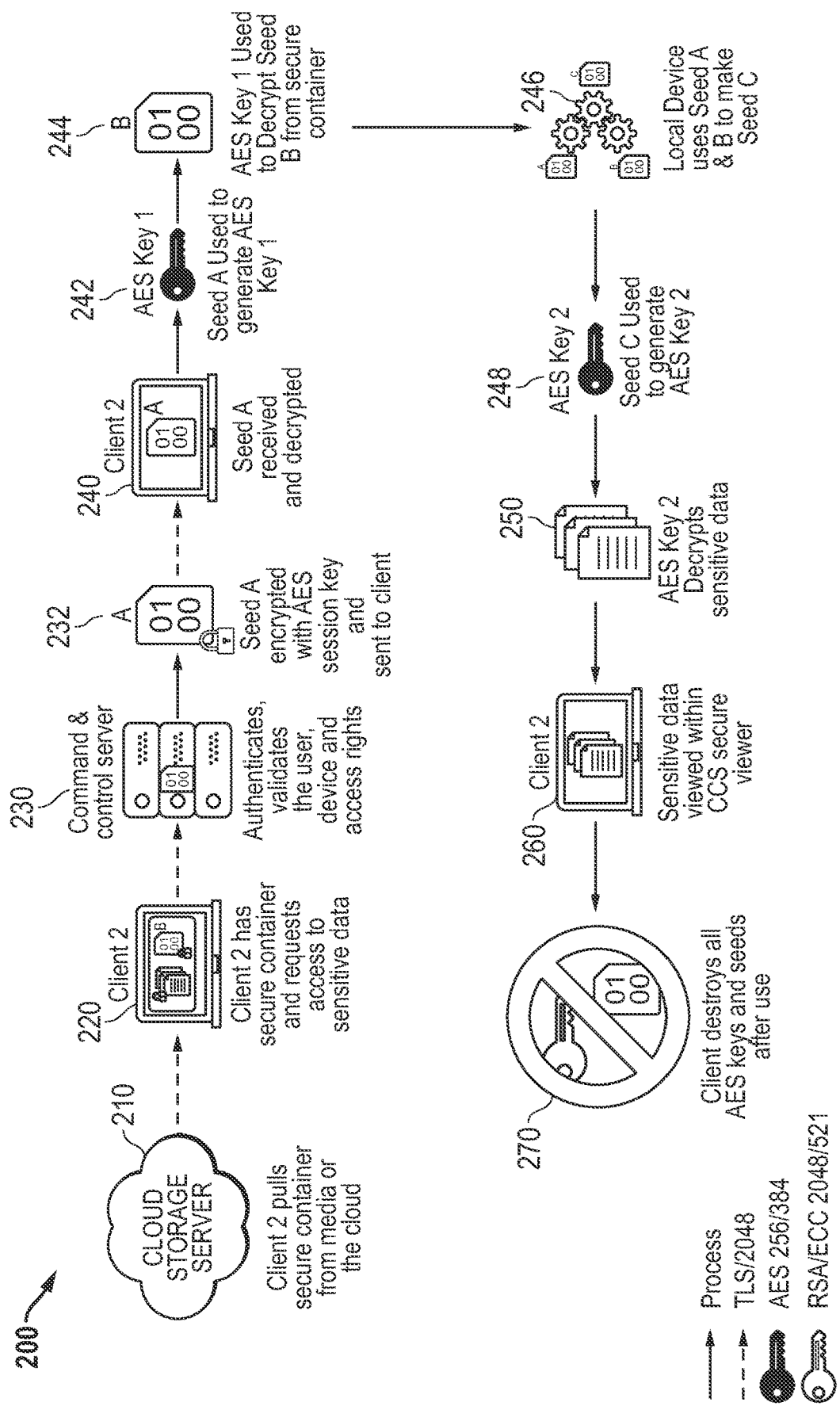
FIG. 2 shows a flow diagram that would be used by a data accessor according to the embodiments herein.

FIG. 2 shows a flow diagram 200 that would be used by a data accessor according to the embodiments herein. Using the TKST method, the data accessor, also referred to as Client 2, performs the following steps:

Data Accessor
1. Data accessor (hereinafter "accessor") has credentials, and generates public and private keys (RSA or ECC);
2. Accessor receives the secure container from the cloud or other media;
3. Accessor opens the secure container and begins the process of requesting access to encrypted data;
4. Accessor sends their public key and container metadata to CCS via an SSL or TLS connection;
5. Server authorizes the request, and retrieves Seed A and the formula for the container that needs to be opened;
6. Server encrypts Seed A and the formula using Accessor public key;
7. Server passes encrypted Seed A and the formula to Accessor via the SSL or TLS connection;
8. Accessor decrypts container using its private key;
9. Accessor uses Seed A to generate AES Key 1;
10. Accessor uses AES Key 1 to decrypt Seed B and the formula;
11. Accessor combines Seed A and B to create Seed C, using the formula provided by Server;
12. Accessor uses Seed C to generate AES key 2;
13. Accessor uses AES Key 2 to decrypt the payload, the payload being viewable, for example, by a local client secure viewer; and
14. Accessor destroys all Seeds and AES keys.

In flow diagram 200, at process node 210, a medium such as a cloud storage server as stores a secure container previously created and uploaded by a data creator as shown in FIG. 1. A data accessor, also referred to as Client 2, desires to access the data in the secure container. It establishes a secure session with the cloud storage server using TLS/2048 and the cloud storage server transfers the data securely using TLS session keys. At process node 220, Client 2 receives the secure container but is not yet able to decrypt it. It creates or has already created a public key-private key pair, and Client 2 sends a request to access it to the CCS along with its public key and the metadata from the secure container, again securely using at least one AES session key such as a TLS/2048 session key. At process node 230, the CCS authenticates the request, validates Client 2 as a user, and determines access rights. At process node 232, the CCS retrieves the Seed A and formula associated with the secure container, and encrypts it using the AES session key. At process node 240, Client 2 receives and decrypts Seed A and the formula using its corresponding AES session key. At process node 242, Client 2 generates a first key known as AES Key 1 from Seed A, and at process node 244 uses AES Key 1 to decrypt Seed B from the encrypted Seed B in the secure container. At process node 246, Client 1 combines Seeds A and B using the formula to create Seed C, the Data Seed. At process node 248, Client 2 uses Seed C to generate a second key known as AES Key 2. At process node 250, Client 2 uses AES Key 2 to decrypt the payload, i.e. the sensitive data that Client 1 wishes to protect but also to allow Client 2 to access. At process node 260, Client 2 has access to the sensitive data. In the example shown in FIG. 2, Client 2 has viewing rights but not printing or saving rights, so a secure viewer available to Client 2 allows Client 2 to view the sensitive data. At process node 270, Client 2 destroys all keys and seeds and the formula after use, including all encrypted forms thereof.

Using the TKST process, the CCS never receives a copy of Creator's sensitive data, only Seed A and the formula. When the CCS sends Seed A and the formula, it uses a secure communication protocol, such as one using symmetric AES session keys like TLS or SSL. Moreover, AES Key 1 and AES Key 2 only exist for a very short period of time, on the order of a few microseconds, and the clients at which they are created, either Client 1 or Client 2, can securely destroy them after use.

Details of an Exemplary TSKT System

Figure 3:
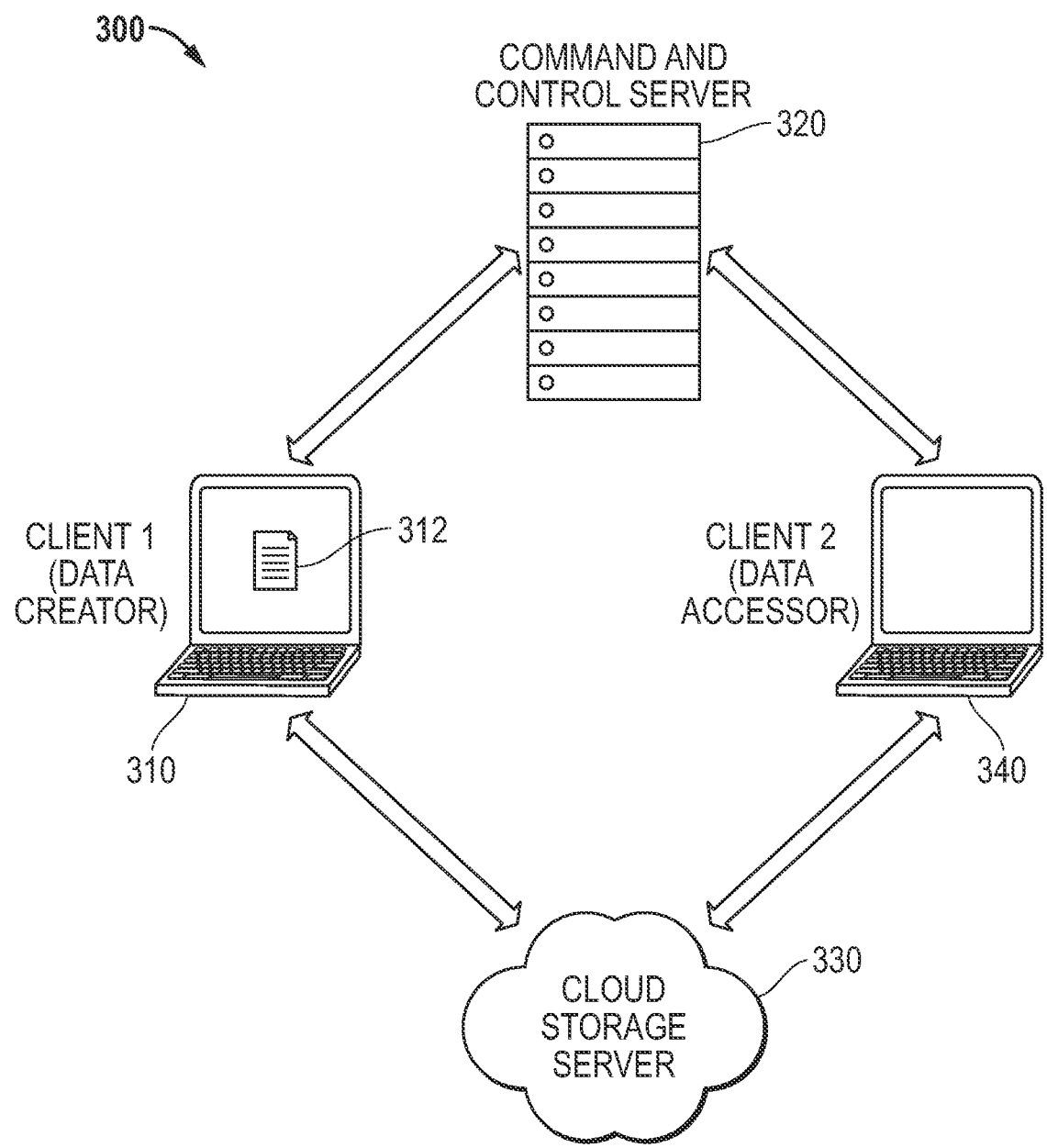
FIG. 3 illustrates a block diagram of a transient symmetric key technology (TSKT) system that can implement the TSKT flows of FIGS. 1 and 2 according to various embodiments described herein.

FIG. 3 illustrates a block diagram of a TSKT system 300 that can implement the TSKT flows of FIGS. 1 and 2 according to various embodiments described herein. As explained above, a TSKT system defines four roles: a data creator, a command and control server (CCS), a storage server, and a data accessor. In some embodiments, the same physical computer system can function as both the CCS and the storage server.

TSKT system 300 includes a client labeled "CLIENT 1" that functions as a data creator 310, a file server system that functions as a CCS 320, a cloud storage server, enterprise server, other file server system, or other storage medium that functions as a storage server 330, and a client labeled "CLIENT 2" that functions as a data accessor 340. Each of CLIENT 1 and CLIENT 2 can have associated with it, for example, a laptop computer, a desktop computer, a notebook computer, a personal digital assistant (PDA), a smartphone, and the like, and in general each of them can be any data processor or data processing system capable of creating digital file content that will be secured at a user's direction and perform the computations as described.

CLIENT 1 and CLIENT 2 communicate with other components including CCS 320 and storage server 330 using existing wired and/or wireless computer networks, and TSKT system 300 shows these communication paths as bidirectional arrows. Typically, these communications paths will be internet connections implementing secure forms of the TCP/IP protocol that use AES session keys (TLS or SSL) for security. In some embodiments, SSL session keys may be used in place of the TLS session keys.

Data creator 310 first creates a file 312 that he or she wishes to grant data accessor 340 access to. The file can be, for example, a word processing document, a plain text file, a spreadsheet file, a visual presentation file, an photograph, an audio recording, a video recording, and the like. The user associated with data creator 310 may wish to secure file 312 because it contains credit card credentials, user passwords, personal health information, confidential business information, company trade secrets, attorney work product or attorney-client privileged communications, or other sensitive data. File 312 is stored in memory of the computer associated with data accessor 310, and would be vulnerable to hacking or theft if sent over a public network such as the internet to data accessor 340, and may additionally be subject to hacking or theft if stored on either CCS 320 or storage server 330. TSKT system 300 assumes zero trust from computer networks and from organizations that operate CCS 320 and storage server 330.

Figure 4:
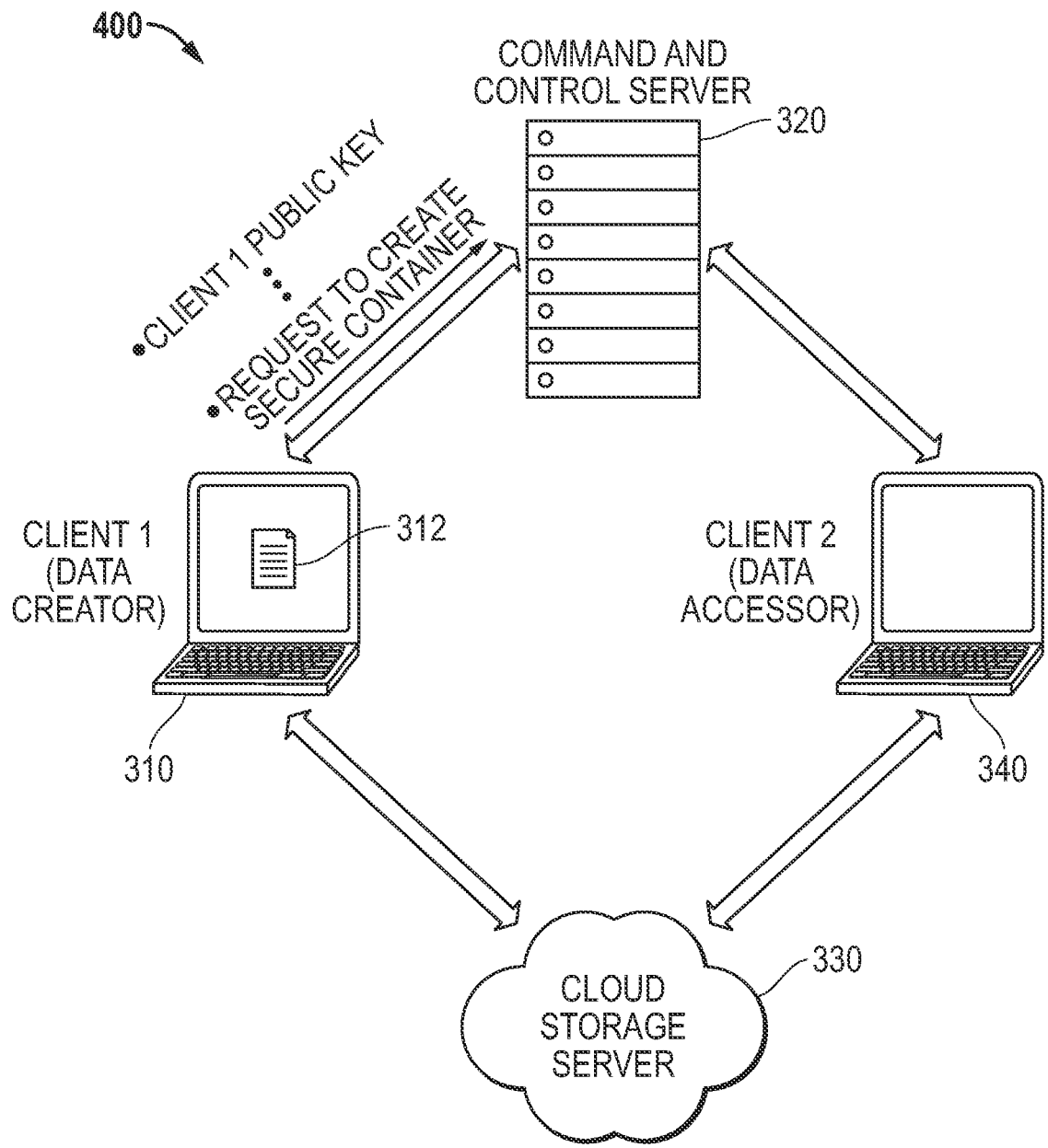
FIG. 4 illustrates a block diagram of the TSKT system of FIG. 3 when the data creator requests the creation of a secure container.

FIG. 4 illustrates a block diagram 400 of TSKT system 300 of FIG. 3 when data creator 310 requests the creation of a secure container. In order to request the secure container according to various embodiments described herein, data creator 310 first creates a public key-private key pair, and sends the public key to CCS 320, before requesting the creation of a secure container. For example, data creator 310 may send its public key to CCS 320 through an application running on the computer associated with it and at a time when client 310 registers the application with CCS 320.

Subsequently, data creator 310 desires to store data securely on storage server 330, or to send data to data accessor 340 using other means. At this point, data creator 310 sends a request to create a secure container to CCS 320. In some embodiments, the user creates the request using software resident on client 310's associated computer. In one example, the software can be a stand-alone program running under the associated computer's operating system. In another example, the software can be a plug-in, applet, or widget that is tightly coupled to another program, such as an EMAIL program. In an exemplary embodiment, the software displays a graphical user interface that allows the user to select options associated with the creation secure container. The software preferably interacts with CCS 320 in the background and in a way that is invisible to the user to create a better user experience.

Figure 5:
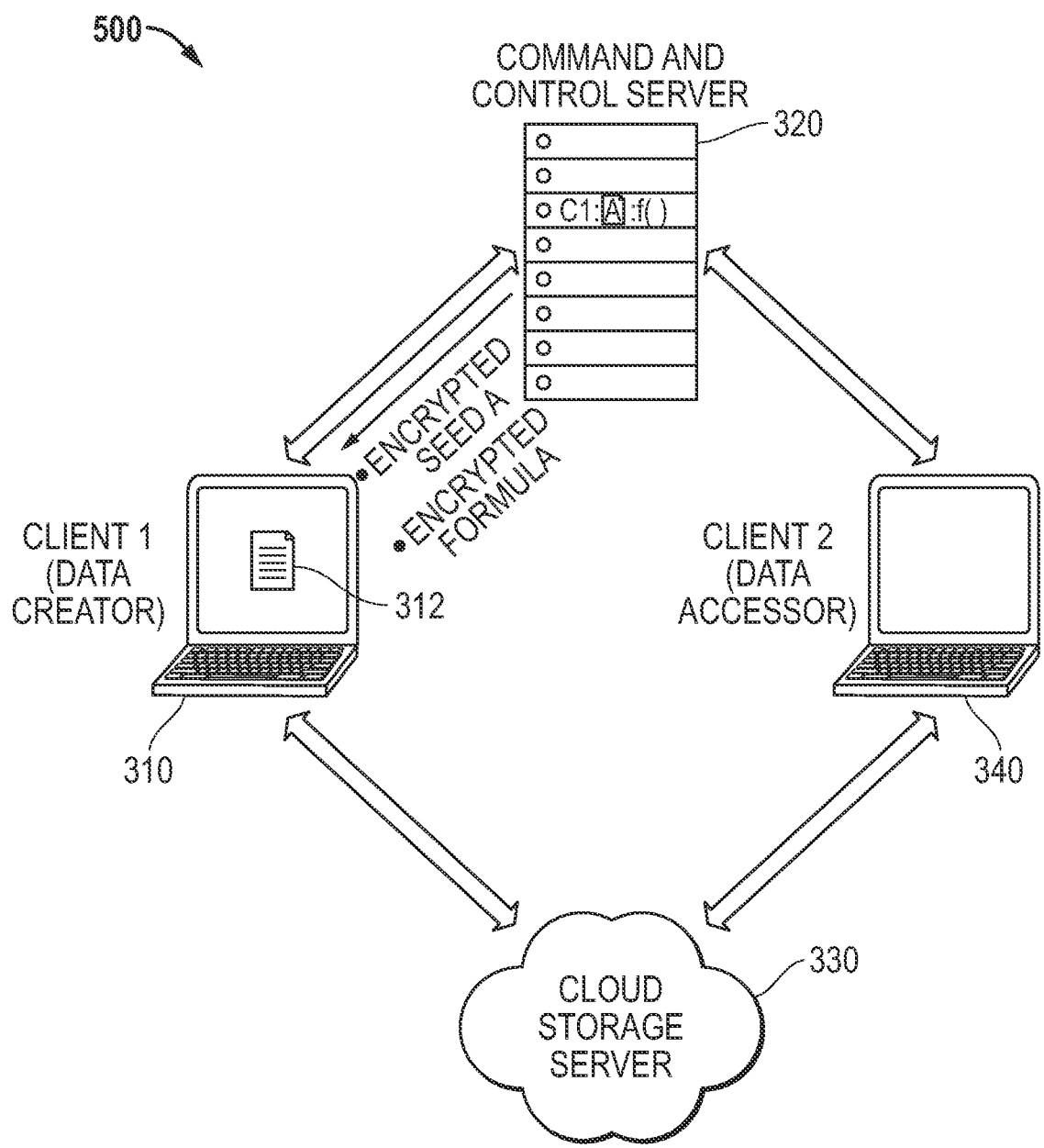
FIG. 5 illustrates a block diagram of the TSKT system of FIG. 3 showing the actions of the CCS in response to the request for the creation of the secure container.

FIG. 5 illustrates a block diagram 500 of TSKT system 300 of FIG. 3 showing the actions of CCS 320 in response to the request for the creation of the secure container. CCS 320 first creates a record in its database or file system associated with the secure container identifying the request as coming from data creator 310, using a tag labelled "Cl". CCS 320 creates a Seed A (described above) and a randomly unique formula and associates them with the secure container request for the particular client in its database. CCS 320 then encrypts Seed A and the randomly unique formula using, e.g., an AES session key. Thus, the public-network communications containing the encrypted seed and the encrypted formula are themselves protected using conventional but very strong encryption techniques.

Figure 6:
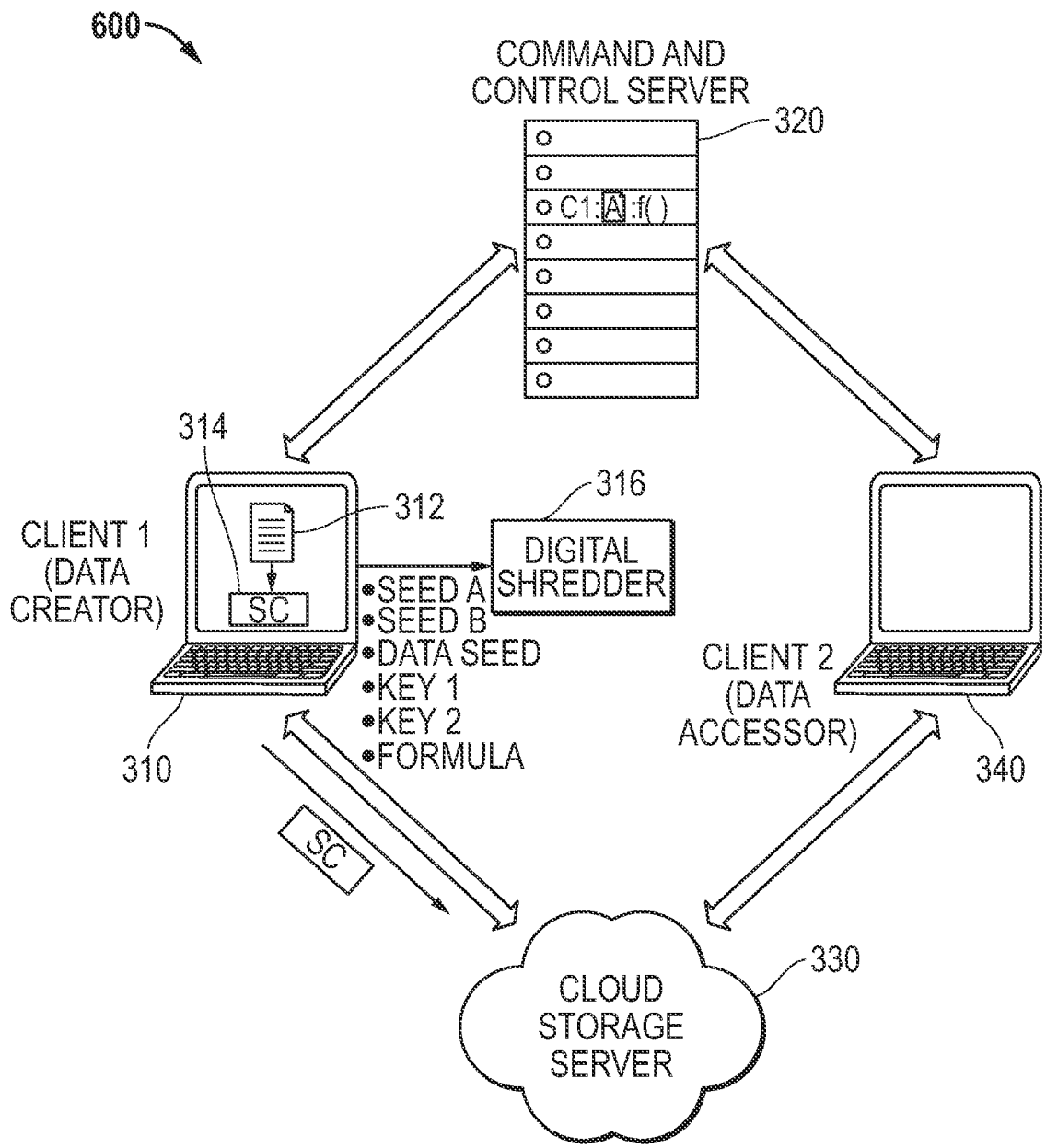
FIG. 6 illustrates a block diagram of the TSKT system of FIG. 3 showing the creation of the secure container.

FIG. 6 illustrates a block diagram 600 of TSKT system 300 of FIG. 3 showing the creation of a secure container 314 by the data creator 310, i.e. Client 1. As described above, after communicating with CCS 320 using TLS session keys, data creator 310 decrypts Seed A and the formula using its corresponding session key. Data creator 310 generates Seed B locally using a pseudo random number generator (PRNG). Data creator 310 then combines Seed A and Seed B using the decrypted formula to create Seed C, the Data Seed.

Data creator 310 also uses Seed A to generate AES Key 1, and encrypts Seed B using AES Key 1. Data creator 310 uses the Data Seed (Seed C) to generate AES Key 2, and encrypts the data payload, i.e. the file desired to be protected, using AES Key 2. Data creator 310 then combines encrypted Key 2 and encrypted Seed B with various metadata to form secure container 314, labelled "SC". The metadata includes various data rights management (DRM) indicators such as copy, printing, and/or saving privileges, biometrics that can uniquely identify the user of data creator 340 such as fingerprints, facial characteristics, and the like, geographic information of data creator 340 for geo-fencing access rights, a device identifier (Device ID), and access rights such as timelines that indicate when accesses are allowed or prohibited.

Shortly after use in creating secure container 314, data creator 310 destroys all keys and seeds and the formula. In this system, data creator 310 destroys both AES Key 1 and AES Key 2, as well as Seed A, Seed B, the Data Seed, and the formula, and any encrypted versions of them, using a digital shredder 316. A conventional file erase process of a personal computer operating system does not destroy or overwrite the data when the file is moved to the "recycle bin" or "trash", but merely deletes the file entry in the directory. Data of a recently deleted file may actually persist in computer memory for some time, making it subject to hacking and discovery. In addition, data that has been stored in a solid-state virtual memory drive, such as one based on floating-gate memory, may still be discoverable even after its nominal erasure, due to incomplete erasure or remaining charge profiles on the floating gates. To prevent these possibilities, data creator 310 uses digital shredder 316 to securely remove the data not only by removing its identification in the file directory, but also by overwriting the physical memory that the data was stored in sufficiently to prevent later discovery.

By creating Seed B using the PRNG with an adequate size, data creator 310 makes it practically impossible for a hacker to reproduce Seed B using random number generation. Moreover by allowing the seeds and keys to exist for only a brief period of time before they are digitally shredded, data creator 310 makes it difficult for a hacker that surreptitiously is able to access data creator 310's computer remotely, to understand the significance of the activity quickly enough to capture the necessary seeds, formula, and keys while they exist and therefore to decrypt secure container 314.

Figure 7:
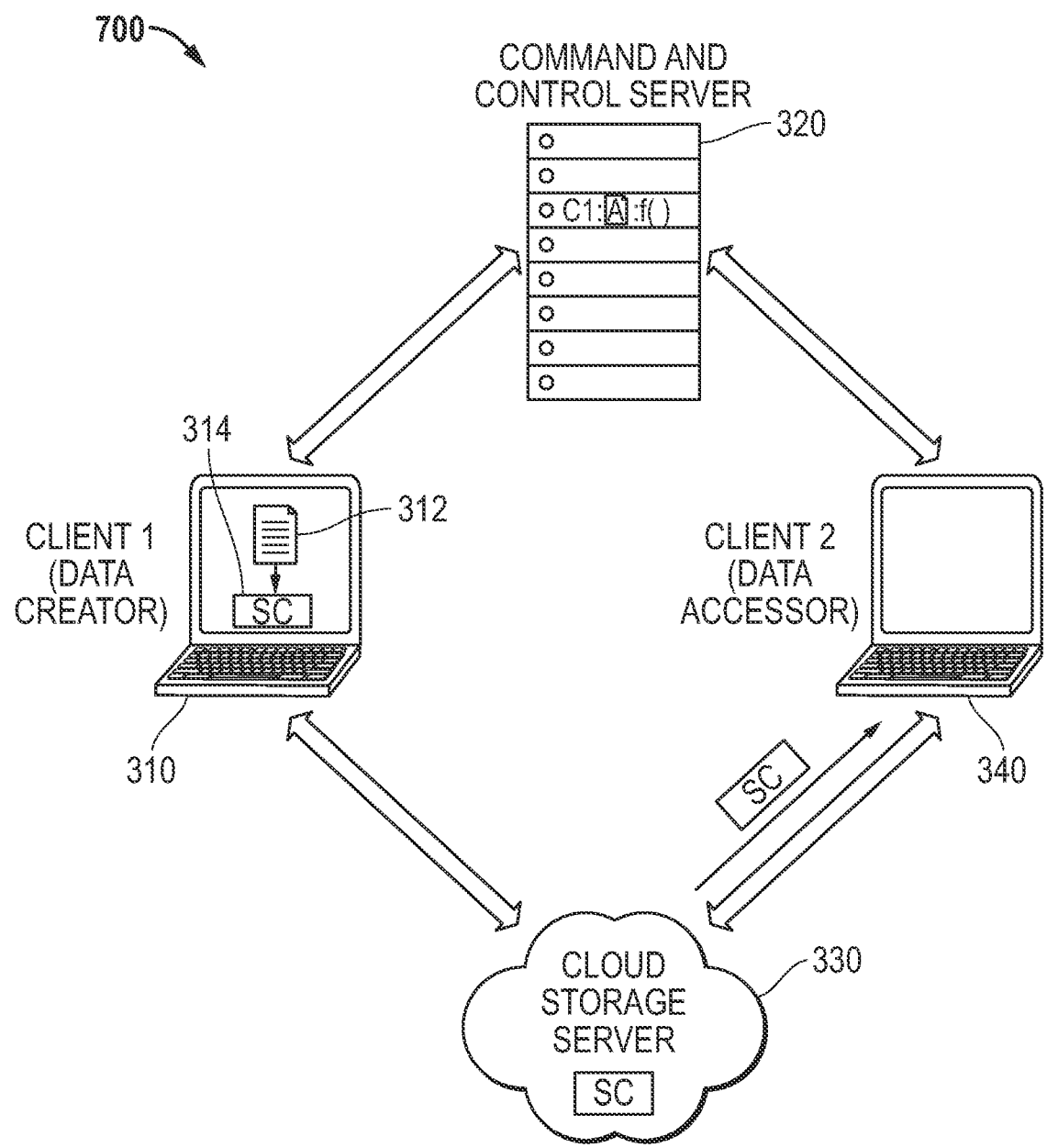
FIG. 7 illustrates a block diagram of the TSKT system of FIG. 3 showing of the retrieval of the secure container by an authorized data accessor.

FIG. 7 illustrates a block diagram 700 of TSKT system 300 of FIG. 3 showing of the retrieval of the secure container by an authorized data accessor. In this example, data accessor 340 is presumed to be an authorized data accessor. Data accessor 340 fetches the secure container from storage server 330. For example, the secure container may become visible in a shared file folder on storage server 330, and data accessor 340 accesses the file as it would access any other file under its operating system. For example, data accessor 340 accesses storage server 330 using the internet and the TLS protocol that creates secure session keys for the session. In another example, data creator 310 may send the secure container to data accessor 340 as an attachment to an electronic mail (EMAIL) message. In this case, the message is routed to data accessor 340's EMAIL server, and the message appears in the EMAIL Inbox of data accessor 340 from which it can be fetched. In yet another example, a user associated with data creator 310 transfers the secure file to the user associated with data accessor 340 using a portable medium such as a flash memory "thumb" drive that can be accessed by data accessor 340's computer.

Figure 8:
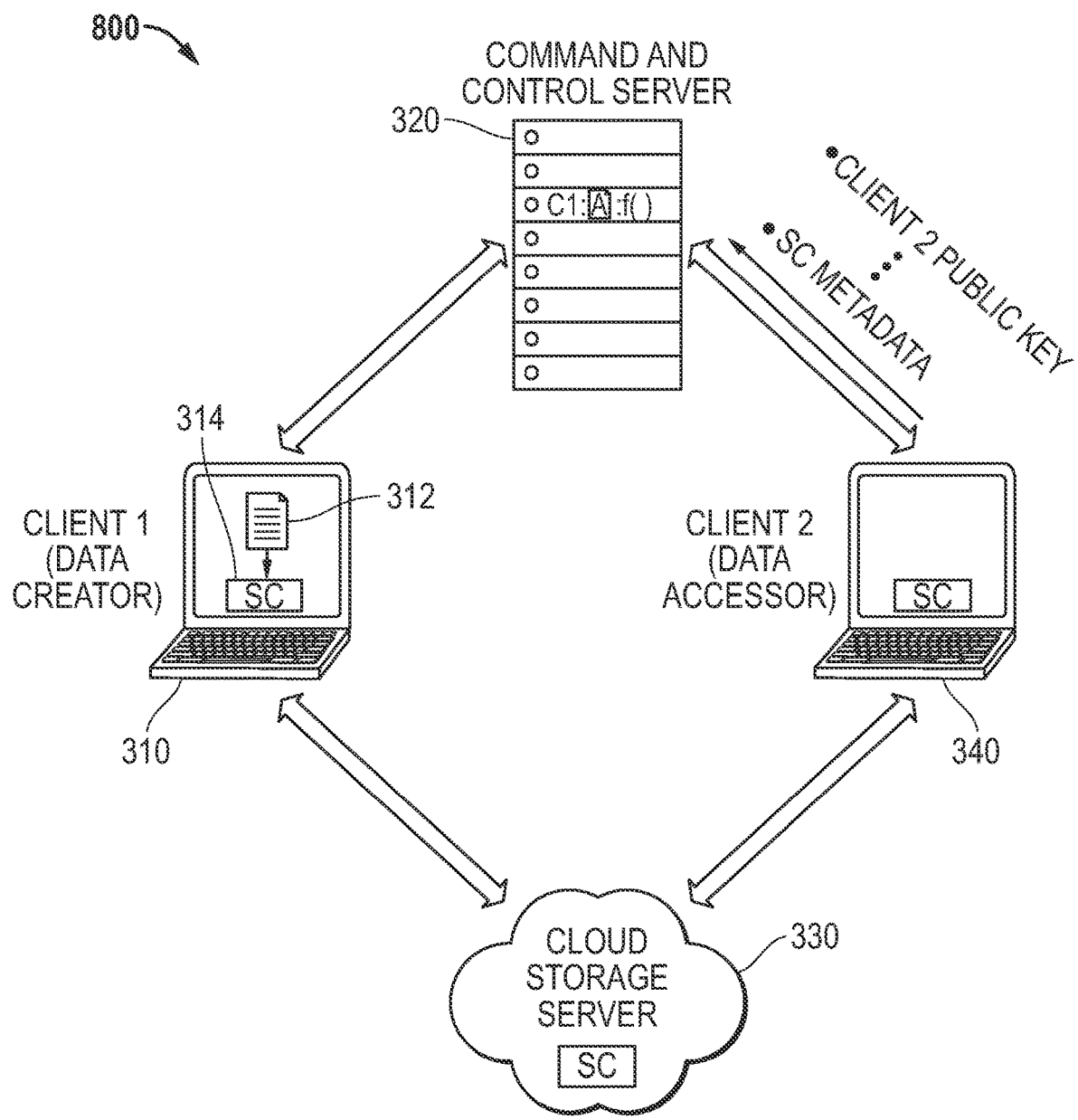
FIG. 8 illustrates a block diagram of the TSKT system of FIG. 3 showing a request by the authorized data accessor to decrypt the secure container.

FIG. 8 illustrates a block diagram 800 of TSKT system 300 of FIG. 3 showing a request by the authorized data accessor 340 to decrypt the secure container. As with data creator 310, data accessor 340 initially creates a public key/private key pair, and sends the public key to CCS 320. Later after receiving a secure container, data accessor 340 opens a secure session with CCS 320 using an SSL or TLS connection, and sends a secure request to CCS 320 to decrypt the secure container along with the SC metadata.

Figure 9:
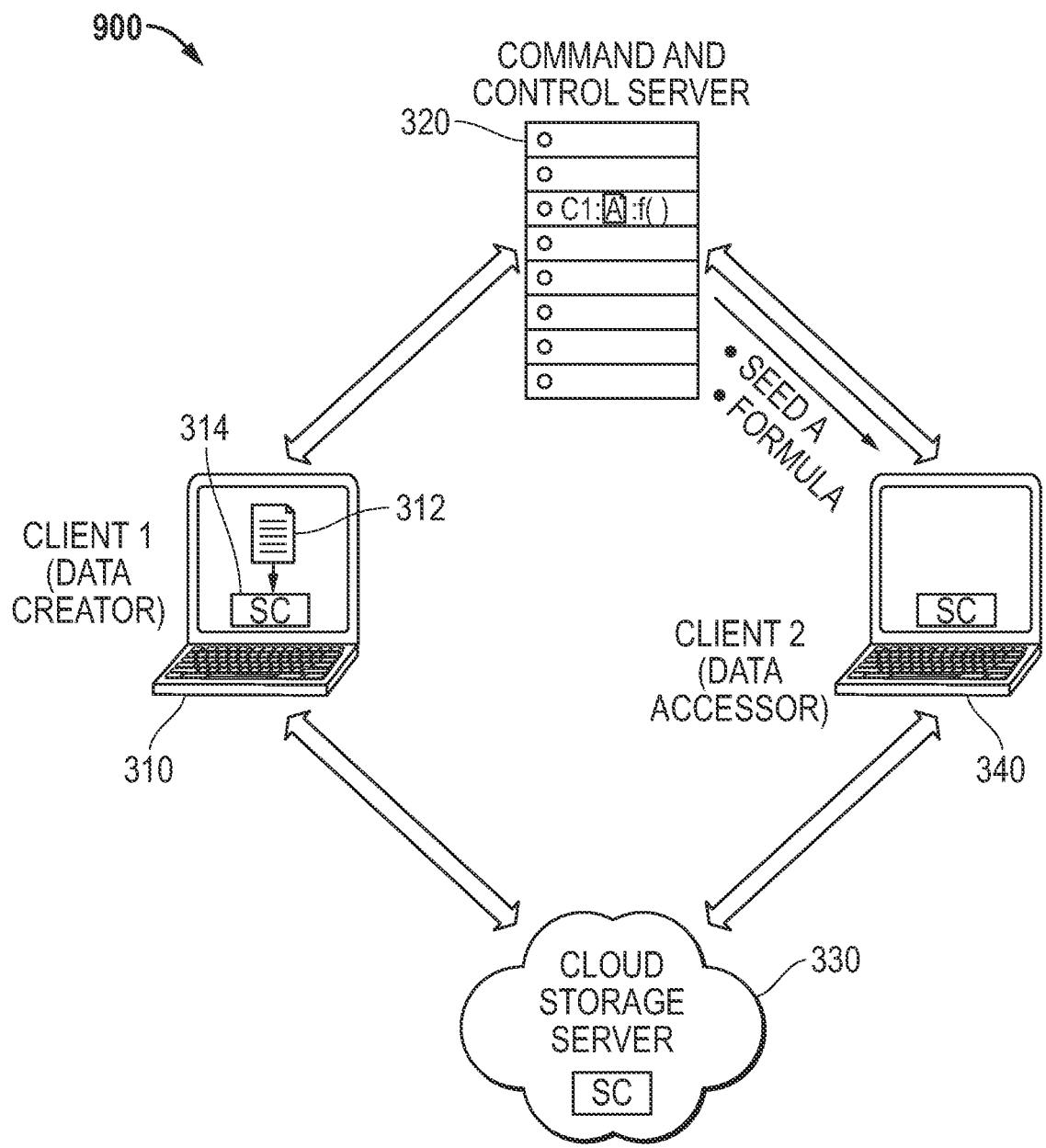
FIG. 9 illustrates a block diagram of the TSKT system of FIG. 3 when the CCS responds to the request for the retrieval of the secure container by the authorized data accessor.

FIG. 9 illustrates a block diagram 900 of TSKT system 300 of FIG. 3 showing the actions of CCS 320 in response to the request for the decryption of the secure container. The actions shown in block diagram 900 assume that CCS 320 authorizes the transmission based on the metadata in the secure container, i.e. that CCS 320 is able to identify client 340 as an authorized user using the biometrics, the computer associated with client 340 is allowed to access it based on its location according to the geo-fencing data, the allowed times for accessing the data are met, etc., for those metadata features that are enabled. Assuming all the metadata allows it, then CCS 320 encrypts Seed A using data accessor 340's public key, passes encrypted Seed A and the encrypted formula associated with the secure container to data accessor 340 using the secure session keys.

Figure 10:
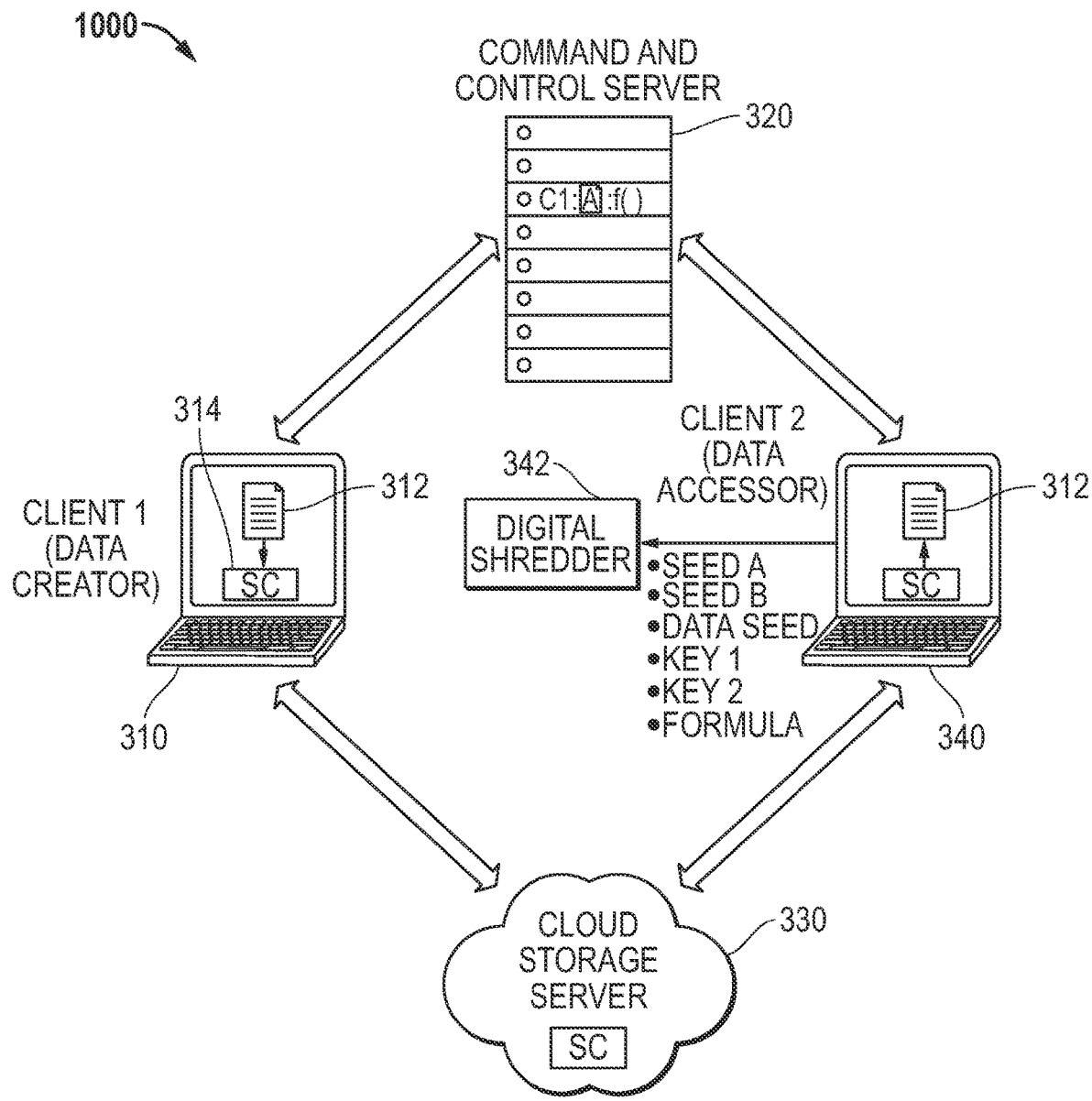
FIG. 10 illustrates a block diagram of the TSKT system of FIG. 3 when the data accessor decrypts the secure container.

FIG. 10 illustrates a block diagram of TSKT system 300 of FIG. 3 when data accessor 340 decrypts the secure container. As described above, data accessor 340 receives and decrypts the secure container using an AES session key. Data accessor 340 extracts the encrypted seed A and the encrypted formula and decrypts them using its corresponding AES session key. Data accessor 340 then uses Seed A to generate AES Key 1, and uses AES key 1 to decrypt seed B from the secure container. Data accessor 340 uses Seed A and Seed B and the formula to create Seed C, the data seed. Data accessor 340 uses Seed C to generate AES key 2, and uses AES key 2 to decrypt the payload, i.e. the data file. The data file is viewable using the secure software and may also be savable and/or printable based on the data rights management attributes set by data creator 310.

Shortly after use in creating the keys to decrypt encrypted Seed B and create AES keys 1 and 2, data accessor 340 destroys all keys and seeds and the formula including both AES Key 1 and AES Key 2, as well as Seed A, Seed B, the Data Seed, and the formula, and encrypted forms thereof, using a digital shredder 342. Digital shredder 342 preferably operates in the same general way as digital shredder 316 of FIG. 3 as described above to robustly destroy any indicia of the contents of the secure container or the keys and seeds created from it.

Multi-Factor Geofencing

Encryption and/or decryption can take place using a conventional PKI algorithm, or using an enhanced encryption algorithm. One enhanced encryption algorithm is the transient symmetric key technology (TSKT) algorithm described above. However even with the use of the TSKT algorithm which defies hacking because the keys are not stored but are only in existence for a very short period of time, the inventors have discovered that it is worthwhile to add an extra layer of security. For example, a person may be trusted by an organization and be given security credentials but then violate the trust given to him or her. For example, an employee of a company may obtain some of the company's secrets, and then sell them to a competitor. Moreover, a person may be employed by a government organization but attempt to obtain government secrets for use by a foreign government either using his or her own credentials or by giving them to a third party. Also, a person may have unadvisedly stored their TSKT credentials in a file on their computer and the computer is stolen by a hacker who can gain access to the user's file system including the credentials.

Through any of these techniques, a non-trusted party may gain access to sensitive data protected using TSKT. In order to protect such non-trusted access, a technique known as "geo-fencing" may be used to restrict access to the data based on the accessing device's physical location. However, using conventional geo-fencing, information that identifies the physical location can be surreptitiously inserted into the data stream to fool a data server using known hacking techniques. In order to add further security to the process, the inventors have developed a secure, multi-factor geofencing technique and system that are significantly more difficult to hack than conventional geo-fencing techniques.

Figure 11:
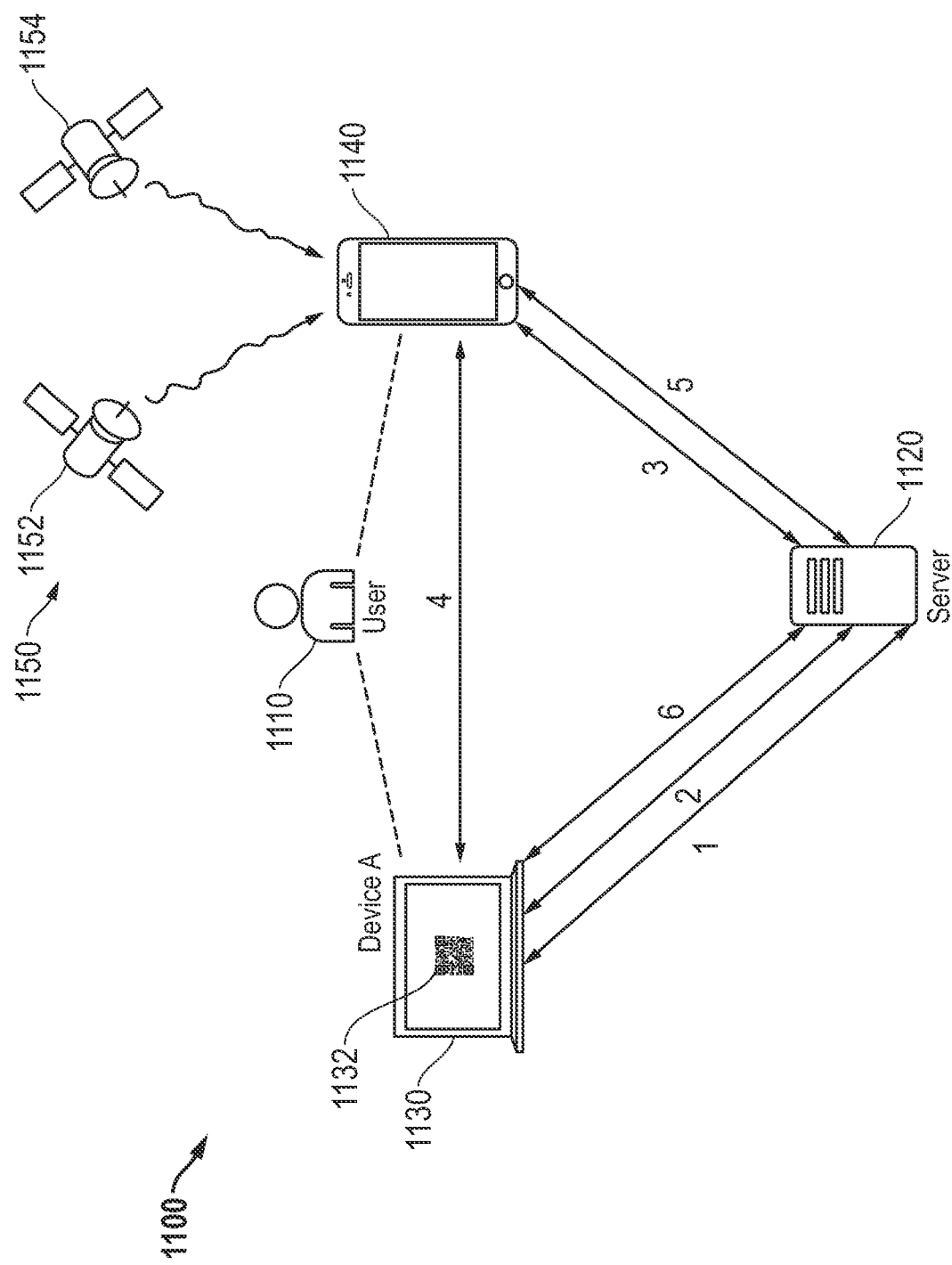
FIG. 11 illustrates a block diagram of a secure data processor system implementing multi-factor authentication according to various embodiments disclosed herein.

FIG. 11 illustrates a block diagram of a secure data processor system 1100 implementing multi-factor authentication according to various embodiments disclosed herein. Data processing system 1100 operates to assist an authorized user 1110 to access a secure data file in his or her possession, while protecting the existing security of the system using multi-factor authentication. For this purpose, data processing system 1100 also includes a first computing device 1130 and a second computing device 1140 accessible to user 1110. First computing device 1130 could be, for example, a desktop computer, a laptop computer, a notebook computer, a personal digital assistant, a mobile phone, or any other type of computing device that the user has access to that stores the secure data file and allows the display of a machine-readable optical label such as a QR code. Second computing device 1140 is a computing device that the user also has access to includes a camera and could be, for example, a handheld device such as a notebook computer, a personal digital assistant, a mobile phone, or any other type of computing device that allows the optical capture of the machine-readable optical label displayed on computing device 1130, and the determination of its geolocation such as through the use of a GPS satellite system 1150 using a GPS receiver in computing device 1140.

The conceptualized geo-fencing system defines four roles made up of a User (authorized user 1110), two devices labeled "Device A" (first computing device 1130) and "Device B" (second computing device 1140) available to user 1110 who wants to obtain credentials to access a secure data file from a server labeled "Server" (server 1120). Device A is, for example, a desktop computer, a laptop computer, a notebook computer, a thin client terminal, and the like. Device B is, for example, a handheld device such as a smart phone, a tablet, or the like. In the specific example shown in FIG. 2, Device B is a smart phone that includes an integrated camera and a controller for cellular triangulation or wi-fi triangulation, or a GPS controller that receives terrestrial coordinates directly from the GPS satellite system. In the exemplary embodiment, the Server is the same CCS shown in FIGS. 1 and 2 that is used for TSKT processing.

The flow of operations proceeds as follows. In Step 1, shown by arrow 1 between first computing device 1130 and server 1120, Device A initiates communication with the Server. A user of Device A logs into the Server using credentials known to the user and registered with the Server, and sends its geolocation information to the server along with a request for rights to decrypt the secure data file. The Server then creates and returns a security token, e.g. a signed JSON Web Token.

In Step 2, shown by arrow 2 between first computing device 1130 and server 1120, the user requests, through a GUI, for the server to decrypt a secure data file available to first computing device 1130. The Server then returns a machine-readable optical label, e.g. a QR code, to Device A, and Device A displays the image of the QR code on its screen.

In Step 3, shown by arrow 1 between second computing device 1140 and server 1120, the user logs into the Server from Device B. The Server creates and returns a security token for Device B.

In Step 4, shown by arrow 4 between second computing device 1140 and first computing device 1130, the user uses the camera built into Device B to scan QR code 1132 displayed by Device A. Device B uses the security token to decode the data from the scanned QR code.

In Step 5, shown by arrow 5 between second computing device 1140 and server 1120, Device B submits decoded data from the scanned QR code and its geolocation information. The geolocation information is determined using one of several methods determined by the client software, such as the GPS position obtained by triangulating its position by receiving signals from GPS satellites 1152 and 1154, internet protocol (IP) addresses, wireless networking protocols such as the protocol known as "WiFi" specified by the WiFi Alliance, and cellular triangulation. The geolocation format for the latitude and longitude are sent to the Server in decimal format, e.g. "12.34567, 12.34567". If the Server is able to successfully validate the geolocation coordinates, then it creates and stores a link between the Device A security token and the Device B security token. The Server then returns a link completion status to Device B.

In Step 6, shown by arrow 6 between server 1120 and first computing device 1130, the Server verifies that the coordinates of Device A and Device B correspond to an acceptable location. For example, the Server can verify that Device B is located within specifically permitted geolocation coordinates. In another example, the Server can verify that Device B is located within the specifically permitted geolocation coordinates, and/or can determine whether Device B is not located within prohibited geolocation coordinates. Once the presence of Device B is found to be in a suitable location, then server 230 returns the requested data to Device A.

Figure 12:
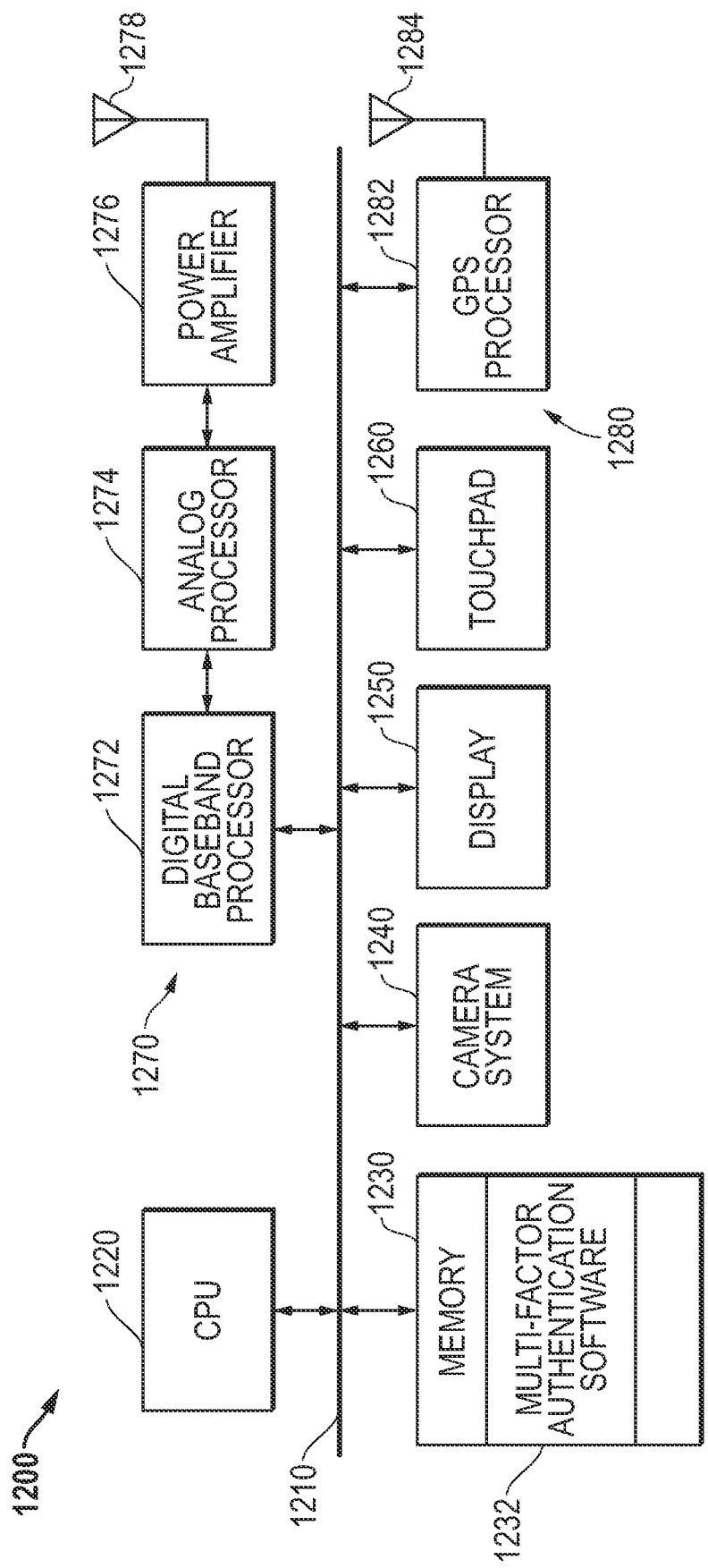
FIG. 12 illustrates a block diagram of a mobile device that can be used to implement the second computing device of FIG. 11.

FIG. 12 illustrates a block diagram of a mobile device 1200 that can be used to implement second computing device 1140 of FIG. 11. Mobile device 1200 includes a bus 1210 which electrically connects several components, including a CPU 1220, a memory 1230, a camera system 1240, a display 1250, a touchpad 1260, a cellular radio section 1270, and a GPS section 1280. CPU 1220 is bidirectionally connected to bus 1210 for initiating read or write accesses to the memory and peripheral components connected to bus 1210. Memory 1230 is bidirectionally connected to bus 1210, and contains both non-volatile memory for storing software applications, parameters, and user data such as music, digital photographs, and applications as well as high-speed memory volatile memory to store working variables and perhaps portion of software for fast execution. The memory also stores multi-factor authentication software used to implement the multi-factor authentication technique described herein in a region of memory 1232. Camera system 1240 includes a controller and a camera built into mobile device 1200 that is suitable for obtaining images of high enough resolution so that CPU 1220, operating under the control of multi-factor authentication software, can decode the QR code or other visual image. Display 1250 is used as an output interface device, and is typically a high-definition screen that may be, for example, about 5 centimeters (cm) by 9 cm in area. Touchpad 1260 is an input device the interacts with the operating system and various applications that display virtual keyboards, radio buttons, and the like on display 1250, and is typically implemented as an invisible membrane integral with display 1250 for an intuitive user interface. Cellular radio section 1270 includes several components used in interfacing to the cellular or Wi-Fi network, including a digital baseband processor 1272, an analog processor 1274, a power amplifier 1276, and an antenna 1278. GPS section 1280 includes a GPS processor 1282 and an antenna 1284. GPS processor 1282 is bidirectionally connected to bus 1210 and receives periodic signals through antenna 1284 from a constellation of satellites that allows GPS processor 1282 to determine and report location coordinates to CPU 1220, which in turn provides it to server 1120 as described above. It should be apparent that mobile device 1200 is just one example and additional details and features that have been omitted from this discussion will normally be present, such as a separate WiFi interface connected to bus 1210 along with a WiFi antenna.

Thus, the multi-factor geolocation authentication system described above provides an additional level of security to prevent, e.g., access by a theft of credentials by a bad actor. It uses multi-factor geolocation authentication to defeat a breach that could occur when a hacker merely inserts location data into the digital data communications using known hacking techniques. The geolocation verification that Device A and Device B are in an allowed location and/or are not in a prohibited location, takes place over the "air gap" that is limited to the distance computing device 1140 can capture the visual QR image on the display of computing device 1130. While in the exemplary embodiment the server authenticates location coordinates as a latitude coordinate and a longitude coordinate in decimal format, other formats are possible, including encoding and/or encrypting the coordinates. The multi-factor geolocation authentication system is well-suited for use with the TSKT encryption system described above as well to prevent bad actors from stealing user date from normally trusted sources such as Certificate Authorities.

While various embodiments have been described, it should be apparent that various modifications may exist. For example, different techniques of obtaining geolocation coordinates such as GPS triangulation using GPS satellites 1152 and 1154, IP addresses, wireless networking protocols, and cellular triangulation, and the like may be used. While the exemplary embodiment contemplated the use of QR codes, other machine-readable optical labels that can be used to verify the presence of devices 1130 and 1140 in proximity to each other and in an acceptable location are possible. Various ways of encoding the global coordinates are also possible. Also while the acceptable or prohibited geolocation coordinates can correspond to countries, they can also correspond to smaller or larger localities.

Accordingly, it is intended by the appended claims to cover all modifications that fall within the scope of the disclosed embodiments.

GLOSSARY

The following terms are used herein and have the following meanings:

AES256/384: Advanced Encryption Standard (AES) using either 256-bit encryption or 384-bit encryption
CCS: Command and Control Server
ECC-521: Elliptic curve cryptography using prime fields of 521 bits.
PKI: Public Key Infrastructure
PRNG: Pseudo random number generator
RSA-2048: Rivest-Shamir-Adleman (RSA) system using 2048-bit keys
SSL: Secure Socket Layer
TKST: Transient Symmetric Key Technology
TLS/2048: Transport Layer Security protocol with 2048-bit keys

What is claimed is:

1. A method for allowing access to a secure data file, comprising:
    logging into a server by a first computing device and sending geolocation information of said first computing device to said server;
    requesting rights to decrypt the secure data file by the first computing device, and in response to the requesting, sending a machine-readable optical label from said server to said first computing device;
    displaying the machine-readable optical label by the first computing device;
    logging into the server from a second computing device;
    scanning the machine-readable optical label displayed by the first computing device using the second computing device to create a scanned image, and decoding data from said scanned image using the second computing device to form decoded data;
    submitting geolocation information of the second computing device and said decoded data to the server; and
    validating said decoded data and said geolocation information by said server, and in response to successfully validating the geolocation information, sending a link completion status indicator to the second computing device, and sending information to decrypt the secure data file to the first computing device.

2. The method of claim 1, further comprising:
    decrypting a seed from the secure data file; and
    using said seed to decrypt data from a secure container using transient symmetric key technology (TSKT) cryptography.

3. The method of claim 1, wherein:
    the method further comprises linking allowed geolocation information to the secure data file; and
    validating said geolocation information by the server further comprises comparing said geolocation information to said allowed geolocation information and successfully validating said geolocation information in response to a match between said geolocation information and said allowed geolocation information.

4. The method of claim 3, wherein:
    linking said allowed geolocation information to the secure data file comprises creating a list of allowed locations; and
    establishing said allowed geolocation information in response to said list of allowed locations.

5. The method of claim 1, wherein:
    the method further comprises linking prohibited geolocation information to the secure data file; and validating said geolocation information by the server further comprises successfully validating said geolocation information in response to a mismatch between said geolocation information and said prohibited geolocation information.

6. The method of claim 5, wherein:

the method further comprises linking said prohibited geolocation information to the secure data file; and validating said geolocation information by the server further comprises comparing said geolocation information to said prohibited geolocation information and successfully validating said geolocation information in response to said mismatch between said geolocation information and said prohibited geolocation information.

7. The method of claim 1, wherein said machine-readable optical label comprises a QR code.

8. The method of claim 1, wherein said geolocation information comprises a latitude coordinate and a longitude coordinate.

9. The method of claim 1, wherein:

logging into the server from said second computing device comprises logging into the server from a handheld device with an integrated camera and a controller for determining said geolocation information.

10. The method of claim 9, wherein:

determining said geolocation information comprises analyzing data received from a GPS satellite system.

11. The method of claim 9, wherein:

determining said geolocation information comprises performing triangulation between cellular base stations.

12. The method of claim 1, wherein:

in response to logging into the server by said first computing device, sending a first security token from the server to said first computing device;

in response to logging into the server by said second computing device, sending a second security token from the server to said second computing device; and in response to validating said scanned image, linking said first and second security tokens.

13. A method for a server to authenticate a request for access to a secure data file, comprising:

receiving a first login request and first login credentials from a first computing device, and in response to a match between the first login credentials and first stored credentials, returning a first security token to the first computing device;

receiving a request to decrypt the secure data file and geolocation information from the first computing device and sending a machine-readable optical label to the first computing device in response to said request to decrypt the secure data file;

receiving a second login request and second login credentials from a second computing device, and in response to a match between the second login credentials and second stored credentials, returning a second security token to the second computing device;

receiving geolocation information and decoded data of a scanned machine-readable optical label from the second computing device; and validating said geolocation information from sand first computing device and said geolocation information from said second computing device by the server, and in response to successfully validating the geolocation information, linking the first and second security tokens, sending a link completion status indicator to the second computing device, and sending information to decrypt the secure data file to the first computing device.

14. The method of claim 13, wherein the geolocation information comprises a latitude coordinate and a longitude coordinate.

15. The method of claim 14, wherein each of the latitude coordinate and the longitude coordinate is in decimal format.

16. The method of claim 14, wherein the server stores data in the secure data file using transient symmetric key technology (TSKT) cryptography.

17. The method of claim 14, wherein:

validating said geolocation information comprises comparing said geolocation information with a list of acceptable locations associated with the secure data file by the server.

18. The method of claim 13, wherein the machine-readable optical label comprises a QR code.

19. The method of claim 13, wherein:

logging into the server from the second computing device comprises logging into the server from a handheld device with an integrated camera and a controller for determining the geolocation information.

20. The method of claim 19, wherein:

determining the geolocation information comprises analyzing data received from a GPS satellite system.

21. The method of claim 19, wherein:

determining the geolocation information comprises performing triangulation between cellular base stations.

* * * * *